United States Patent [19]

Wener

[11] Patent Number: 4,532,618
[45] Date of Patent: Jul. 30, 1985

[54] SYSTEM FOR AND METHOD OF PROCESSING A SEISMIC SIGNAL

[75] Inventor: Kenneth R. Wener, Littleton, Colo.

[73] Assignee: Marathon Oil Company, Findlay, Ohio

[21] Appl. No.: 380,153

[22] Filed: May 20, 1982

[51] Int. Cl.³ .......................... G01V 1/28; G01V 1/36
[52] U.S. Cl. ........................................ 367/46; 367/48; 367/49; 367/59; 364/421
[58] Field of Search .................... 367/43, 49, 74, 45, 367/46, 68, 38, 50, 48, 59, 70; 364/421, 422, 577, 576

[56] References Cited

U.S. PATENT DOCUMENTS

| | | | |
|---|---|---|---|
| 2,907,400 | 10/1959 | Swafford, Jr. | 367/43 X |
| 2,944,620 | 7/1960 | Van Dijck | 367/70 |
| 3,065,815 | 11/1962 | Hersey et al. | 367/49 X |
| 3,163,750 | 12/1964 | Lindsey et al. | 364/421 X |
| 3,284,763 | 11/1966 | Burg et al. | 367/45 |
| 3,414,874 | 12/1968 | McLoad | 340/7 |
| 3,421,141 | 1/1969 | Meyerhoff | 364/421 X |
| 3,432,807 | 3/1969 | Lindsey | 367/43 |
| 3,491,848 | 1/1970 | Giles | 181/0.05 |
| 3,668,618 | 6/1972 | Quay | 367/68 |
| 3,710,082 | 1/1973 | Sloane et al. | 364/576 X |
| 3,840,845 | 10/1974 | Brown | 340/7 R |
| 3,852,708 | 12/1974 | Doolittle et al. | 340/7 R |
| 3,867,713 | 2/1975 | Tegland et al. | 340/15.5 |
| 3,893,066 | 7/1975 | Saunders | 367/43 X |
| 3,899,768 | 8/1975 | Quay et al. | 367/68 |
| 3,973,112 | 8/1976 | Sloane | 364/576 X |
| 3,979,713 | 9/1976 | Parrack | 340/7 R |
| 4,041,443 | 8/1977 | Thigpen | 340/15.5 |
| 4,042,905 | 8/1977 | Fort et al. | 340/15.5 |
| 4,146,870 | 3/1979 | Ruehle | 340/7 R |
| 4,187,492 | 2/1980 | Delignieres | 367/127 |

OTHER PUBLICATIONS

Seismic Signal Processing by Lawrence C. Wood and Sven Treitel—Proceedings of the IEEE, vol. 63, No. 4, Apr. 1975.

Primary Examiner—Nelson Moskowitz
Assistant Examiner—Brian Steinberger
Attorney, Agent, or Firm—Jack L. Hummel; Rodney F. Brown

[57] ABSTRACT

A seismic signal is created, processed and recorded and then analyzed to determine the nature of subterranean formations. A method of creating, processing and recording a seismic signal comprises the steps of creating a seismic signal; detecting the seismic signal at a first location during a selected time period simultaneously within a first frequency bandwidth and within a second frequency bandwidth, the second frequency bandwidth at least partially overlapping the first frequency bandwidth; creating a first band limited electrical signal representative of the seismic signal at the first location during a selected time period within the first frequency bandwidth; creating a second band limited electrical signal representative of the seismic signal at the first location during a selected time period within the second frequency bandwidth; combining the two band limited signals into a single signal having a frequency bandwidth including the first frequency bandwidth and the second frequency bandwidth; and displaying the single signal. The method according to the present invention permits optimal processing of each band limited signal, such that the displayed single signal possesses a relatively high signal-to-noise ratio and relatively accurately represents the original seismic signal.

9 Claims, 8 Drawing Figures

SYSTEM FOR AND METHOD OF PROCESSING A SEISMIC SIGNAL

TECHNICAL FIELD

The present invention relates to a system for and method of processing a seismic signal to determine the nature of subterranean formations.

BACKGROUND ART

Much information concerning the nature of subterranean formations is obtainable by analyzing signals or waves produced by a seismic disturbance. Such disturbances are artificially produced by utilization of a variety of energy sources such as dynamite or other high energy explosive, implosive air guns, electrical sparkers, and vibrating chirp systems. The energy source generates seismic source waves that propagate through the earth and are reflected and refracted from subterranean interfaces where the acoustic velocity and density are sufficiently different between adjacent materials. The waves eventually return to the earth surface where they are detected by a selected array of seismometers such as geophones (for land use) and piezoelectric transducers (for marine use), which are distributed along the earth surface above the area of exploration. The seismometers convert the siesmic mechanical vibrations into electrical signals. By studying the electrical signals produced by the seismometers in response to the seismic wave vibrations and by knowing other variables such as the location of the seismometers and the location of the seismic source wave generator, analysts are able to make determinations concerning the nature of the subterranean structure of the earth.

Many types of seismic disturbances possess a broad frequency spectrum that extends from a few hertz (cycles per second) to several kilohertz (thousands of cycles per second). As is well known to geophysicists, seismic waves in the upper end of the seismic spectrum become attenuated (weakened) as the waves travel deeper into the earth. The energy loss is due to solid friction in the earth and to scattering by inhomogeneities such as boulders and fractures in the subsurface strata. Accordingly, seismic energy from relatively shallow strata, 500 to 1000 feet deep, may be rich in high frequencies up to 1 or 2 kilohertz whereas seismic energy reflected from deep-seated strata is characterized by much lower frequencies in the 10–30 hertz range.

In seismic exploration, the stratigraphic resolution (the capability of distinguishing two closely spaced strata or earth layers) depends, among other things, upon the frequency of the reflected seismic signals. Use of relatively high-frequency reflections in the range of 100 to 1000 Hz (hertz) is needed to distinguish between layers that are separated by only a few feet. Stratigraphic resolution of the above-defined degree is required for study of shallow strata in connection with engineering foundation problems, coal exploration, etc. In petroleum exploration, higher resolution is sought at all levels but is more critical at the shallower levels because smaller deposits may be of interest in view of the lower cost of drilling shallower oil wells. Grosser resolution of deep-seated strata may be found to be acceptable. Hence, lower-frequency reflections can be useful for deeper exploration.

In conventional practice, the electrical signal produced by the seismometer, in response to the seismic wave vibrations, is sampled at selected time intervals, converted to digital form such as binary numbers, and recorded on magnetic tape. At some later time, the original electrical signal is reconstructed from the tape-recorded data samples. In accordance with the well known Nyquist theorum, the sampling rate must be at least twice as fast as the highest frequency which is to be transmitted or converted. To attenuate frequencies higher than the Nyquist frequency, it is customary for many signal processing systems to include "alias" filters.

The period of recording electrical signals transmitted by the seismometers normally lasts between 6 and 15 seconds after the generation of the seismic source waves, depending upon the depth of the deepest subterranean structure of interest and upon the type of energy source utilized. The amplitude of the electrical signal may vary 100 or more decibels during the recording period. Also, during the first few seconds of recording, the electrical signal results generally from the waves reflected, etc., from shallow formations, whereas, during the last few seconds of recording, the electrical signal results generally from waves reflected, etc., from deep formations. Thus, the electrical signal is initially composed of both high and low frequencies, and is later composed of lower frequencies.

A patentability search was conducted for the present invention, and the following patents were uncovered:

| U.S. Pat. No. | Inventor | Issue Date |
| --- | --- | --- |
| 3,414,874 | McLoad | Dec. 3, 1968 |
| 3,491,848 | Giles | Jan. 27, 1970 |
| 3,840,845 | Brown | Oct. 8, 1974 |
| 3,852,708 | Doolittle et al. | Dec. 3, 1974 |
| 3,979,713 | Parrack | Sept. 7, 1976 |
| 4,042,905 | Fort et al. | Aug. 16, 1977 |
| 4,146,870 | Ruehle | Mar. 27, 1979 |
| 4,187,492 | Delignieres | Feb. 5, 1980 |

U.S. Pat. No. 4,042,905 to Fort et al. states that in prior art seismic methods, it has been customary to use a large plurality of separate groups of geophones each connected by a two conductor cable which carries the geophone signals to a distant recording truck. At the truck each of the separate signals from each of the separate pairs of conductors is separately amplified, controlled, multiplexed and converted from analog to digital form for storage on a magnetic medium.

The other patents discovered during the patentability search are believed to have virtually no relevance to the present invention and serve merely to illustrate the state of the art of seismic surveying systems.

U.S. Pat. No. 3,867,713 to Tegland et al. relates to a seismic survey exploration method using a common depth point technique. Again, this patent is believed to be irrelevant to the present invention other than for showing the state of the art.

An article entitled "Seismic Signal Processing" by Lawrence C. Wood and Sven Treitel and appearing in the proceedings of the IEEE, Volume 63, No. 4 April, 1975 discusses the then prevailing state of the art techniques used in seismic surveying. This article is also believed to be irrelevant to the present invention other than for showing background art.

U.S. Pat. No. 4,041,443 to Thigpen discloses a seismic recording apparatus having a time-varying signal sample rate. The apparatus includes several signal processing channels and means for switching the signal through any one selected channel during the signal recording period. Each channel includes an alias filter, an amplifier, an analog to digital converter and a specified signal sampling rate. Among the drawbacks of the apparatus is that the signal switching causes signal instability and distortion which is especially significant during relatively fast sample rates. Moreover, at any one instant, a relatively wide bandwidth of the signal is processed and analyzed, and it is impossible to optimize the processing of such a relatively broad bandwith signal over the entire frequency range.

DISCLOSURE OF THE INVENTION

The seismic recording technique of the present invention results in a recording of the seismic signal over a relatively broad frequency range. The recorded seismic signal is much more accurately representative of the actual seismic wave signal received by seismometers than the recorded seismic signal using previously known techniques.

The present seismic survey technique includes creating a plurality of band limited electrical signals representative of the seismic wave signal within a certain bandwidth at a selected location, with each of the signals having differing bandwidths and each bandwidth overlapping at least one other bandwidth. Each band limited signal is processed independently of the other band limited signals so that the signal is ideally processed using a selected signal sample rate, filter settings, amplifier gain setting, etc., to provide the optimum signal-to-noise ratio for the recorded seismic signal. Signals having overlapping bandwidths are transformed into the frequency domain and the transformed signals are matched within the overlapping frequency range, thereafter, the signals are transformed back into the time domain to yield a single signal having a relatively broad bandwith.

BRIEF DESCRIPTION OF THE DRAWINGS

The details of the present invention are described with reference to the accompanying drawings, wherein.

BEST MODE FOR CARRYING OUT THE INVENTION

Figure 1:
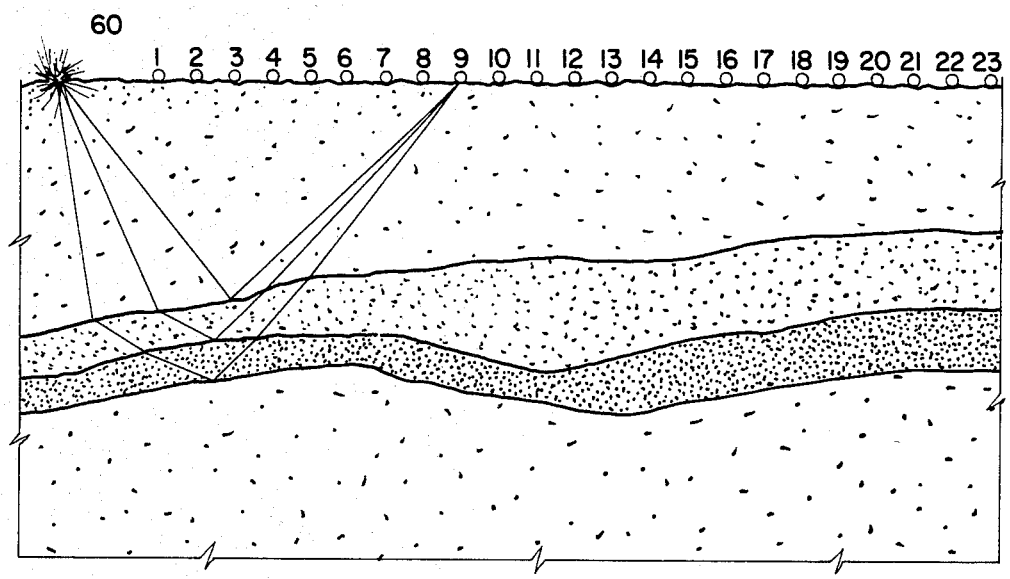
FIG. 1 is a schematic illustration of a seismic survey test in which a plurality of seismometers are arranged along the earth's surface and three paths of travel of a seismic wave from a seismic wave generating point are shown.

FIG. 1 depicts in simplified form the essential elements of a seismic survey test. A set of seismometer arrays are positioned at a plurality of locations 1–23 along the earth's surface. The seismometer arrays may extend for thousands of feet along the earth's surface. The seismometers are connected through electrical wiring to a main spread cable, which in turn is connected to centrally located signal processing equipment located in a truck or ship. The main spread cable typically carries 96 pairs of conductor wire, and typically between 20 and 100 seismometers are connected to a single conductor wire pair.

As shown in FIG. 1, an energy source 60 generates a seismic source wave at a known location relative to the position of the seismometers. The seismic waves refract through and reflect from subterranean formations and are ultimately detected by the seismometers. By way of example, FIG. 1 illustrates three different paths of travel of the seismic waves which ultimately reach the location of the earth's surface where a seismometer array is located. The seismic waves may travel along a great number of different paths to reach any one seismometer location.

To receive the greatest informational content of the seismic wave signal at a particular point on the earth's surface, it is important to detect the signal over a very wide frequency range. The processing and recording of such a broad bandwidth signal is fraught with difficulty, however. First, the seismometer may not be accurately responsive to the seismic wave signal over the entire frequency range. Second, the amplifiers used to augment the signal transmitted by the seismometers are incapable of accurately resolving the drastic changes in amplitude of the broad bandwidth signal which occur within a relatively short time span. A signal amplitude can decay 100 dB in the first three seconds of the recording period. This radical amplitude decay is caused by the attenuation of the high frequencies of the seismic wave signal and also by the natural $1/r^2$ reduction of the signal amplitude, where r is the distance of travel of the seismic wave signal from the location of the signal generation point. To overcome problems associated with this amplitude decay, previous systems have changed the amplifier gain level many times during the signal recording period in order to preserve the signal amplitude for subsequent processing. (See the above noted article entitled "Seismic Signal Processing"). Such gain level change introduces undesirable signal instability and distortion. Another drawback of recording a signal relayed by a seismometer over a relatively large bandwidth is that the sampling rate must be relatively rapid in order to accurately portray the high frequency portion of the signal. Since the high frequency signal is virtually non-existent after the first few seconds of the recording cycle, such a rapid sampling rate produces an unnecessarily large amount of data concerning the signal. The above-noted U.S. Pat. No. 4,041,443 switched the sampling rate during the recording period to limit the amount of data concerning the signal after certain times. The problems associated with such switching were also noted above.

In accordance with the present invention, the seismic wave signal detected at a certain location on the earth's surface is represented as a plurality of signals of various bandwidths, with the bandwidths of the adjacent frequency ranges being at least partially overlapping. This signal representation may be accomplished in either of two ways. If the seismometer is capable of resolving the seismic wave signal over a relatively wide frequency range (such as amplified piezoelectric transducers, which are relatively very expensive, but which respond accurately to frequencies over approximately a 2000 Hertz range), then the signal from the seismometer may be split into a plurality of channels and each channel signal subsequently passed through a band pass filter at the desired bandwidth. For example, the bandwidth of one channel may be 5 to 80 Hertz, the bandwidth of a second channel may be 60 to 160 Hertz, the bandwidth of a third channel may be 130 to 250 Hertz, etc. If the seismometer is capable of accurately responding to seismic signal over only a relatively narrow frequency range (such as a geophone, which is relatively inexpensive, but which has a frequency range of approximatey 200 Hertz), a plurality of geophones each individually connected to a corresponding main spread cable may be placed over the same location on the earth's surface. Each geophone would be designed to respond to a selected range of frequencies of the seismic wave signal and would transmit that detected signal through its corresponding cable, whereupon it would be passed through a band pass filter. For example, the geophone connected to a first cable might detect a signal within a frequency range of 5 to 190 Hertz and the band pass filter associated with the first cable would have a band pass of between 5 and 80 Hertz, the geophone associated with the second cable might have a frequency range of between 5 and 190 Hertz and the band pass filter associated with the second cable would have a pass band of 60 to 160 Hertz, the geophone associated with a third cable might have a frequency range of 100 to 290 Hertz and the band pass filter associated with the third cable would have a pass band of 130 to 250 Hertz, etc. Thus, various methods may be used to represent the seismic wave signal at a selected location on the earth's surface during a certain time period as a plurality of individual signals having overlapping bandwidths.

The processing of the seismic wave signal will now be described with respect to only two band limited signals for the sake of simplicity. It should be understood of course that the processing may be equally effectively applied to more than two such signals. Each signal is amplified either before or after passing through the band pass filter. Thereafter, each band limited signal is processed through an analog to digital converter (A/D converter), whereby the signal is recorded in digital form according to a selected sampling rate appropriate for the frequencies within the bandwidth of the associated signal. These processing steps are usually performed in the truck or the ship at the seismic survey test site, and then the digitalized recorded signals are transported to a laboratory for further processing and analysis.

Figure 2:
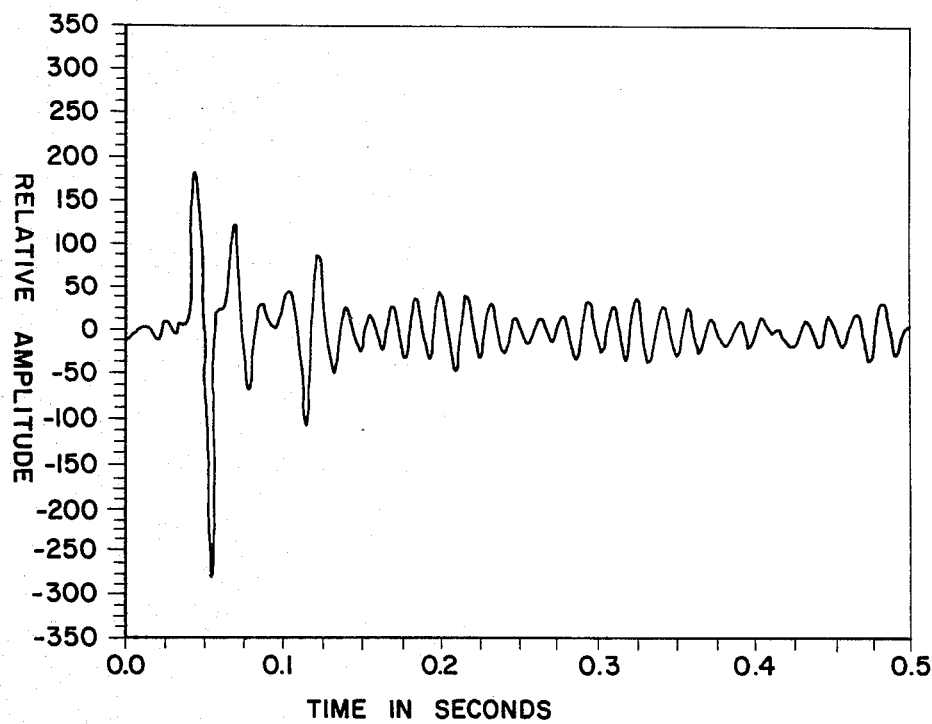
FIG. 2 is a graph of the seismic wave signal detected by a seismometer having a bandwidth of relatively low frequencies.
Figure 3:
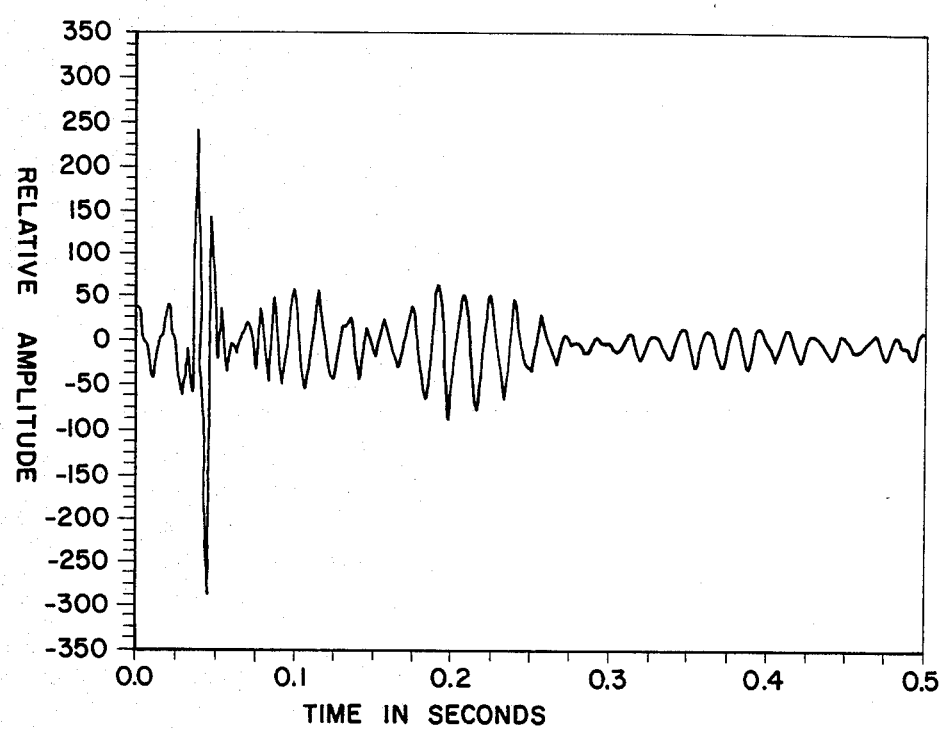
FIG. 3 is a graph of a seismic wave signal detected by a seismometer having a bandwidth of relatively high frequencies, which bandwidth overlaps the signal bandwidth of FIG. 2.

A hypothetical digitalized recorded signal of a band limited signal having a relatively low frequency range is shown in FIG. 2. Similarly, a hypothetical digitalized recorded signal of a band limited signal having a relatively high frequency range is shown in FIG. 3. The bandwidths of the two signals overlap, otherwise there would be an elimination of contribution of some frequencies, and certain frequencies of the seismic waves would not be processed and recorded. At the laboratory, the two digitalized recorded signals are combined to form a single signal having a bandwidth including the bandwidths of the two individual signals. When combining the two signals, it is important that the seismic wave signal represented in the overlapping portion of the bandlimited signals be accurately represented.

Figure 4:
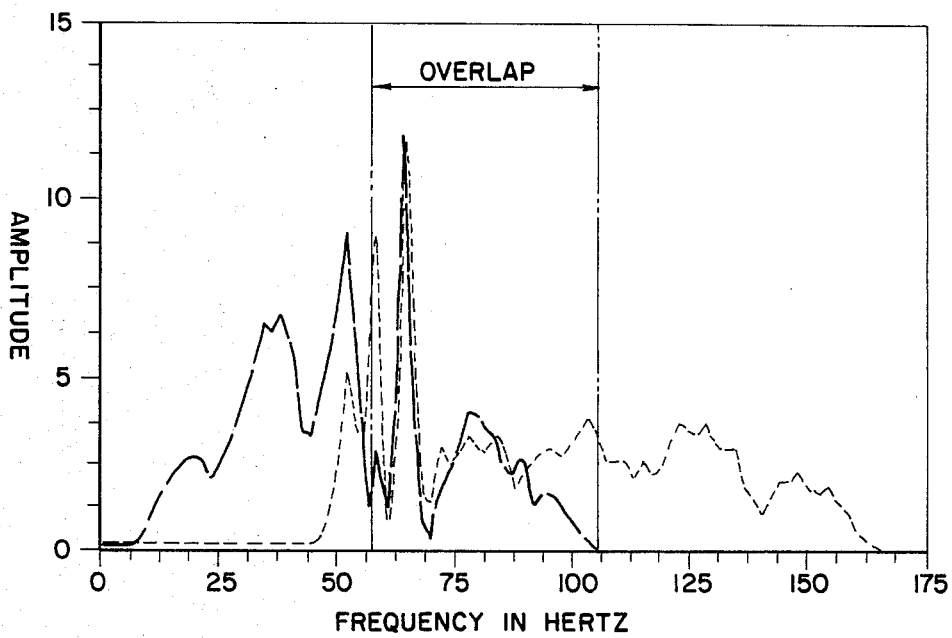
FIG. 4 is a common graph of the amplitude spectra for the signals shown in FIGS. 2 and 3.
Figure 5:
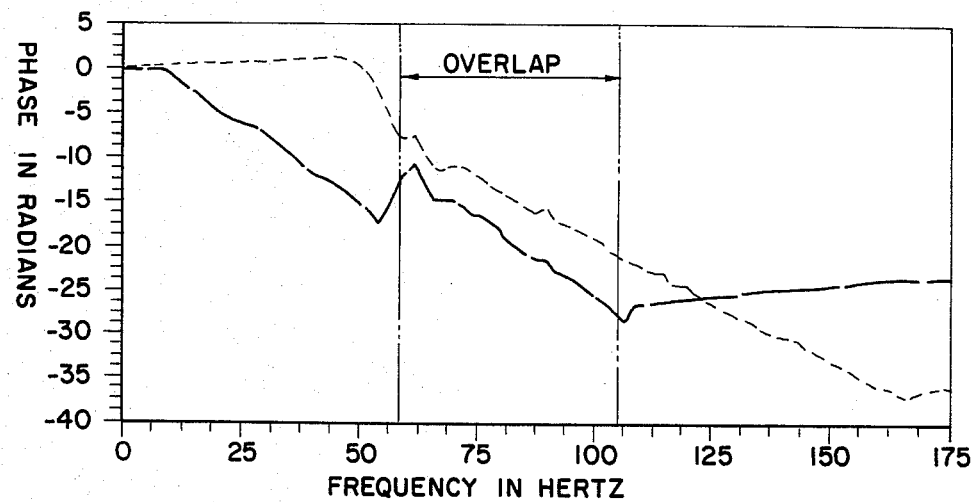
FIG. 5 is a common graph of the unwrapped phase spectra of the signals shown in FIGS. 2 and 3.

Although there are a variety of ways of insuring the relatively accurate representation of the signal within the range of bandwidth overlap, a preferred method will now be described. Each digitalized recorded signal is transformed into the frequency domain using a standard Fourier transform algorithm. This well known transform results in each signal being characterized by a plot of amplitude versus frequency (amplitude spectra) and unwrapped phase versus frequency (unwrapped phase spectra). FIGS. 4 and 5 are graphs of the amplitude spectra and the unwrapped phase spectra, respectively, of the two hypothetical band limited signals of FIGS. 2 and 3 transformed into the frequency domain. One can readily recognize that the characteristics of each signal are slightly dissimilar within the overlapping frequency range of the bandwidths.

Figure 6:
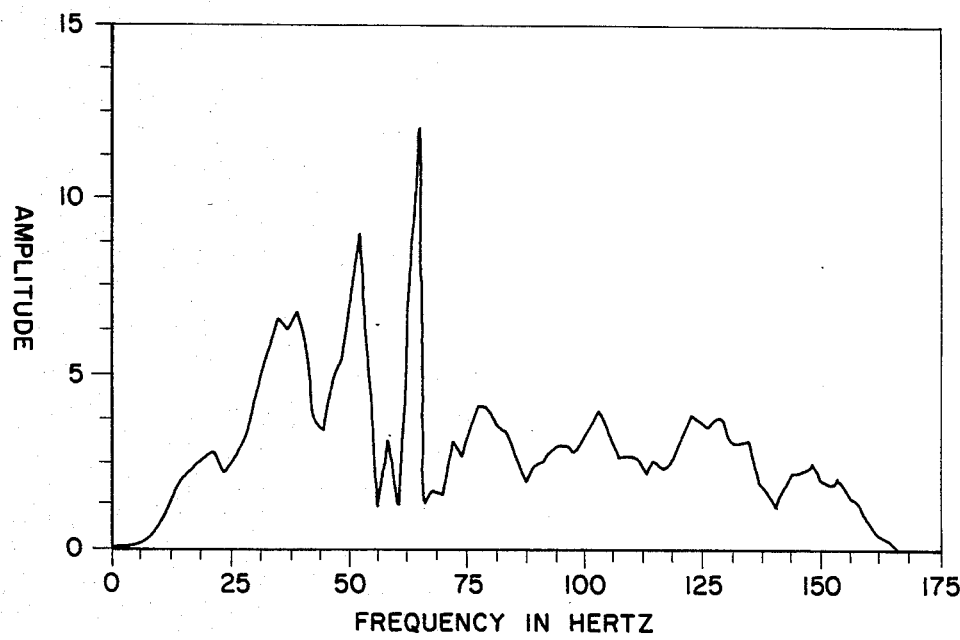
FIG. 6 is a graph of the amplitude spectra of both signals depicted in FIG. 4 after matching the amplitude spectra in FIG. 4 in the region of frequency overlap.
Figure 7:
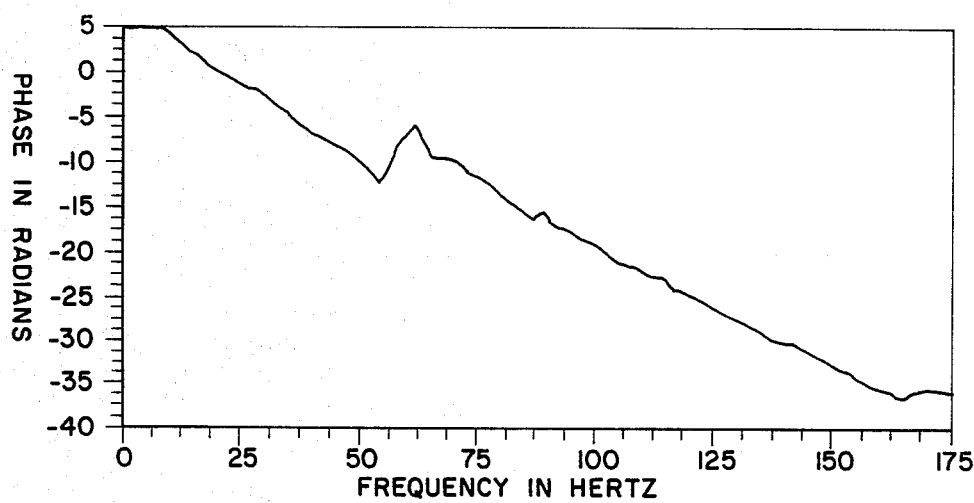
FIG. 7 is a graph of the unwrapped phase spectra of both signals shown in FIG. 5 after matching the unwrapped phase spectra in the region of frequency overlap.

To form the single broad band signal, the signals within the overlapping band width are composited (averaged) using the characteristics of both signals. Again, several compositing methods may be used, however, a preferred method will now be described. With respect to the amplitude spectra, the amplitude spectra of the low frequency bandwidth signal within the overlapping portion of the bandwidths is shifted so that the amplitude of the highest frequency in the band of overlapping frequencies is the same for both the low frequency bandwidth signal and the high frequency bandwidth signal. Then at each frequency within the overlapping bandwidth, the average amplitude of the amplitudes of the low frequency bandwidth signal and the amplitudes of the high frequency bandwidth signal is determined, the locus of these average amplitude points is taken to be the amplitude spectra of the seismic signal within the overlapping bandwidths. Thereafter, the amplitude spectra of the low frequency bandwidth signal outside of the overlapping bandwidth is shifted so that the amplitude of the highest frequency within such range equals the (averaged) amplitude of the lowest frequency within the overlapping bandwidth range. Thereafter, a ramp function is applied to the so modified amplitude spectra in a well known mathematical manipulation so that the amplitude of the signal is zero for frequencies outside the two bandwidths. The amplitude spectra of the two signals, as so modified, is represented in FIG. 6. With respect to the unwrapped phase spectra, the phase is initially unwrapped, and then, the modification technique described for the amplitude spectra is performed, however, no ramp function is applied. The unwrapped phase spectra of the two signals, as so modified, is represented in FIG. 7.

Figure 8:
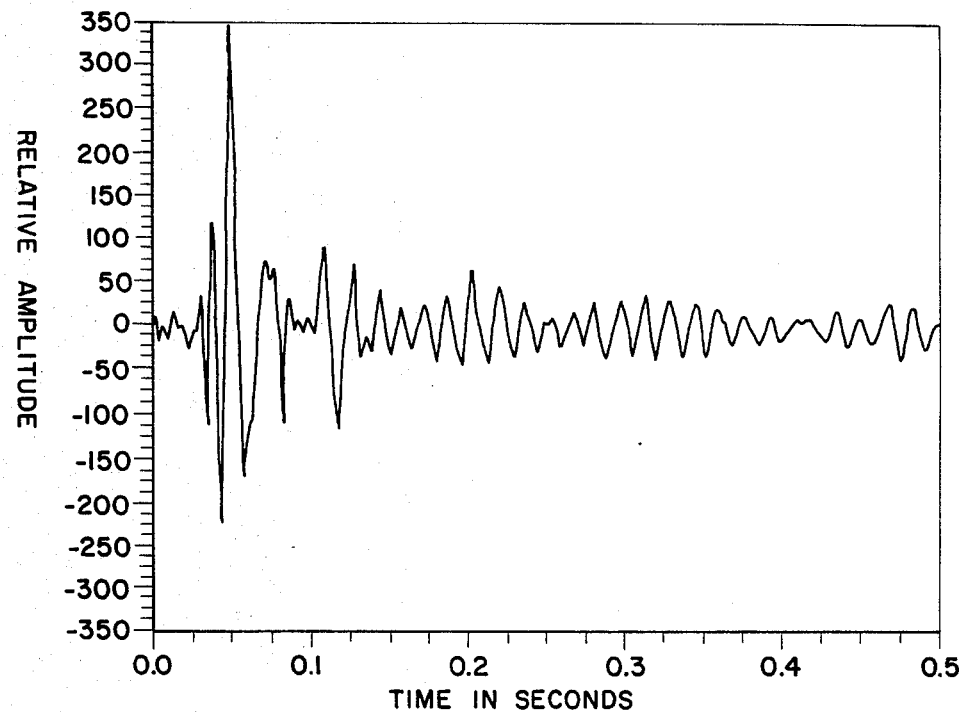
FIG. 8 is a graph of the time signal of a wave having the amplitude and unwrapped phase characteristics depicted in FIGS. 6 and 7, respectively.

The effect of the modification technique is that a single broad bandwidth signal including the bandwidths of both band limited signals is represented in the frequency domain. By performing a reverse Fourier transform, the signal in such form is transformed into the time domain where it becomes the representation of a "real" signal such as indicated in FIG. 8.

It will thus be appreciated that a seismic wave signal is represented in two overlapping bandwidth limited signals which are optimally processed with consideration for the signal characteristics within the associated frequency bandwidth, and the processed signals are then combined to recreate the original seismic wave signal. In the process just described for two band limited signals, a typical design might provide for the first band limited signal to have a 5 Hertz low cut filter, an 80 Hertz high cut filter, a preamplifier zero initial gain setting and a 2 millisecond sample rate and a 6 second recording period, and the other band limited signal to have a 60 Hertz low cut filter, a 160 Hertz high cut filter, a preamplifier 30 decibel initial gain setting, a 1 millisecond sample rate and a 3 second recording period.

It is commonly known that a low frequency protion of a seismic wave signal does not vary significantly over short distances along the earth's surface. Consequently, it is important that seismometers detecting relatively high frequency portions of a seismic wave signal (or relaying a signal which will pass through a band pass filter having relatively high frequency) be relatively closely spaced along the earth's surface, whereas seismometers associated with the relatively low frequency portions of a seismic wave signal need not be so closely spaced. By way of example, with reference to FIG. 1, seismometers associated with the high frequency portions of the seismic wave signal may be located at each of the locations 1–23, and seismometers associated with the low frequency portions of the seismic wave signal may be located at locations 1, 4, 8, etc. A relatively accurate representation of the low frequency band limited seismic wave signal at location 2 may be obtained by averaging the low frequency band limited seismic wave signal at 1 with the low frequency band limited seismic wave signal at 4 and weighing each of the two signals in proportion to the distance of location 1 to location 2 and location 4 to location 2, respectively. Thereafter, the averaged, representative band limited signal calculated for the location 2 would be combined in the above described manner with the high frequency bandwidth limited signal obtained by the seismometer at location 2 to create a single broad band signal. The low frequency band limited seismic wave signal at location 3 may be similarly obtained and combined. Thus, this interpolation method eliminates the need to detect the low frequency portion of the seismic wave signal at all locations, without significantly affecting the accuracy of the low frequency data, but such elimination does reduce the cost involved in acquiring such data.

Although particular embodiments of the present invention have been described and illustrated herein, it should be recognized that modifications and variations may readily occur to those skilled in the art and that such modifications and variations may be made without departing from the spirit and scope of my invention. Consequently, my invention as claimed below may be practiced otherwise than as specifically described above.

I claim:

1. An improved method of seismic signal processing for use in the seismic surveying of subterranean formations located below the earth's surface through creation of seismic waves from a seismic source positioned on the earth's surface, said improved method comprising the steps of:

separately recording, at at least one location on said earth's surface, a plurality of seismic signals from said source, each of said plurality of recorded seismic signals being recorded in different bandwidths with adjacent bandwidths partially overlapping in frequency, separately processing each of said plurality of seismic signals to optimize the recorded signals, transforming each processed seismic signal, into (a) an amplitude-frequency signal and (b) a phase-frequency signal, compositing the two (a) amplitude-frequency signals and (b) phase-frequency signals of adjacent bandwidths of each overlapping frequency region to produce a single composite (a) amplitude-frequency signal and (b) a single composite phase-frequency signal for the overlapping frequency region, and reverse transforming the (a) amplitude-frequency signal and (b) phase-frequency signal of each transformed seismic signal including each composite signal to form a single broad-band amplitude-time seismic signal response for said at least one location.

2. The improved method of claim 1 in which the step of separately recording further comprises sensing of said seismic signals with a plurality of geophones located at said at least one location wherein each geophone is responsive in one of said different bandwidths.

3. The improved method of claim 1 in which the step of separately recording further comprises the steps of:

sensing said seismic signals with a single broadband geophone, and splitting the sensed seismic signal for recording in a plurality of channels wherein each channel is responsive in one of said different bandwidths.

4. The improved method of claim 1 wherein the step of compositing further comprises:

shifting the lower frequency bandwidth signal of the amplitude-frequency signal so that the amplitude of the highest frequency in said overlapping frequency region is the same for both the lower frequency bandwidth signal and the higher frequency bandwidth signal, and averaging the amplitudes of the lower frequency bandwidth signal with the amplitudes of the higher frequency bandwidth signal in said overlapping frequency region to produce said composite signal.

5. An improved method of seismic signal processing for use in the seismic surveying of subterranean formations located below the earth's surface through creation of seismic waves from a seismic source positioned on the earth's surface, said improved method comprising the steps of:

separately recording, at at least one location on said earth's surface, a plurality of seismic signals from said source, each of said plurality of recorded seismic signals being recorded in different bandwidths with adjacent bandwidths partially overlapping in frequency, separately processing each of said plurality of seismic signals to optimize the recorded signals, transforming each processed seismic signal, into (a) an amplitude-frequency signal and (b) a phase-frequency signal, and compositing the two (a) amplitude-frequency signals and (b) phase-frequency signals of adjacent bandwidths of each overlapping frequency region to produce a single composite (a) amplitude-frequency signal and (b) a single composite phase-frequency signal for the overlapping frequency region, said step of compositing comprising the steps of:

(a) shifting the lower frequency bandwidth signal of the amplitude-frequency signal so that the amplitude of the highest frequency in said overlapping frequency region is the same for both the lower frequency bandwidth signal and the higher frequency bandwidth signal, and (b) averaging the amplitudes of the lower frequency bandwidth signal with the amplitudes of the higher frequency bandwidth signal in said overlapping frequency region to produce said composite signal, and reverse transforming the (a) amplitude-frequency signal and (b) phase frequency signal of each transformed seismic signal including said composite signal to form a single broadband amplitude-time seismic signal for said at least one location signal processing.

6. An improved method of seismic signal processing for use in the seismic surveying of subterranean formations located below the earth's surface through creation of seismic waves from a seismic source positioned on the earth's surface, said improved method comprising the steps of:

separately recording low frequency bandwidth signals from said source at first and second locations on said earth's surface, said first and second locations being separated by a short distance, separately recording a high frequency bandwidth signal from said source at a third location, said high frequency signal having an overlapping frequency region with said low frequency signal, said third location being located between the aforesaid first and second locations, averaging the two separately recorded low frequency bandwidth signals to produce an averaged low frequency bandwidth signal for the third location, said averaged signal being based on the proportional spacing from said third location to said first and second locations, separately processing said averaged signal and said high freqency signal to optimize both signals, transforming each of the processed seismic signals, into (a) am amplitude-frequency signal and (b) a phase-frequency signal, compositing the two (a) amplitude-frequency signals and (b) phase-frequency signals of the overlapping frequency region to produce a single composite (a) amplitude-frequency signal and (b) a single composite phase-frequency signal for the overlapping frequency region, and reverse transforming the (a) amplitude-frequency signal and (b) phase-freqency signal of each transformed seismic signal including said composite signal to form a single broad-band amplitude-time seismic signal response for said third location.

7. The improved method of claim 6 wherein the step of compositing further comprises:

shifting the lower frequency bandwidth signal of the amplitude-frequency signal so that the amplitude of the highest frequency in said overlapping frequency region is the same for both the lower frequency bandwidth signal and the higher frequency bandwidth signal, and averaging the amplitudes of the lower frequency bandwidth signal with the amplitudes of the higher frequency bandwidth signal.

8. An improved method of seismic signal processing for use in the seismic surveying of subterranean formations located below the earth's surface through creation of seismic waves from a seismic source positioned on the earth's surface, said improved method comprising the steps of:

separately recording a low frequency bandwidth signal from said source at first and second locations on said earth's surface, said first and second locations being separated by a short distance, separately recording a high frequency bandwidth signal from said source at a third location, said high frequency signal having an overlapping frequency region with said low frequency signal and said third location being located between the aforesaid first and second locations, averaging the two separately recorded low frequency bandwidth signals to produce an averaged low frequency bandwidth signal for the third location, said averaged signal being based on the proportional spacing from said third location to said first and second locations, separately processing said averaged signal and said high frequency signal to optimize both signals, transforming each of the processed seismic signals, into (a) an amplitude-frequency signal and (b) a phase-frequency signal, and compositing the two (a) amplitude-frequency signals and (b) phase-frequency signals of the overlapping frequency region to produce a single composite (a) amplitude-frequency signal and (b) a single composite phase-frequency signal for the overlapping frequency region, and reverse transforming the (a) amplitude-frequency signal and (b) phase frequency signal of each transformed seismic signal including said composite signal to form a single broadband amplitude time seismic signal response for said third location.

9. The improved method of claim 8 wherein the step of compositing further comprises:

shifting the lower frequency bandwidth signal of the amplitude-frequency signal so that the amplitude of the highest frequency in said overlapping frequency region is the same for both the lower frequency bandwidth signal and the higher frequency bandwidth signal, and averaging the amplitudes of the lower frequency bandwidth signal with the amplitudes of the higher frequency bandwidth signal.

* * * * *

UNITED STATES PATENT AND TRADEMARK OFFICE
CERTIFICATE OF CORRECTION

PATENT NO. : 4,532,618
DATED : July 30, 1985
INVENTOR(S) : Kenneth R. Wener

It is certified that error appears in the above–identified patent and that said Letters Patent are hereby corrected as shown below:

Col. 9, lines 13 and
      14:       Delete "signal processing".
Col. 9, line 40:    Delete "am" and insert --an--.

Signed and Sealed this

Third Day of December 1985

[SEAL]

Attest:

Attesting Officer

DONALD J. QUIGG

Commissioner of Patents and Trademarks